UNITED STATES PATENT OFFICE.

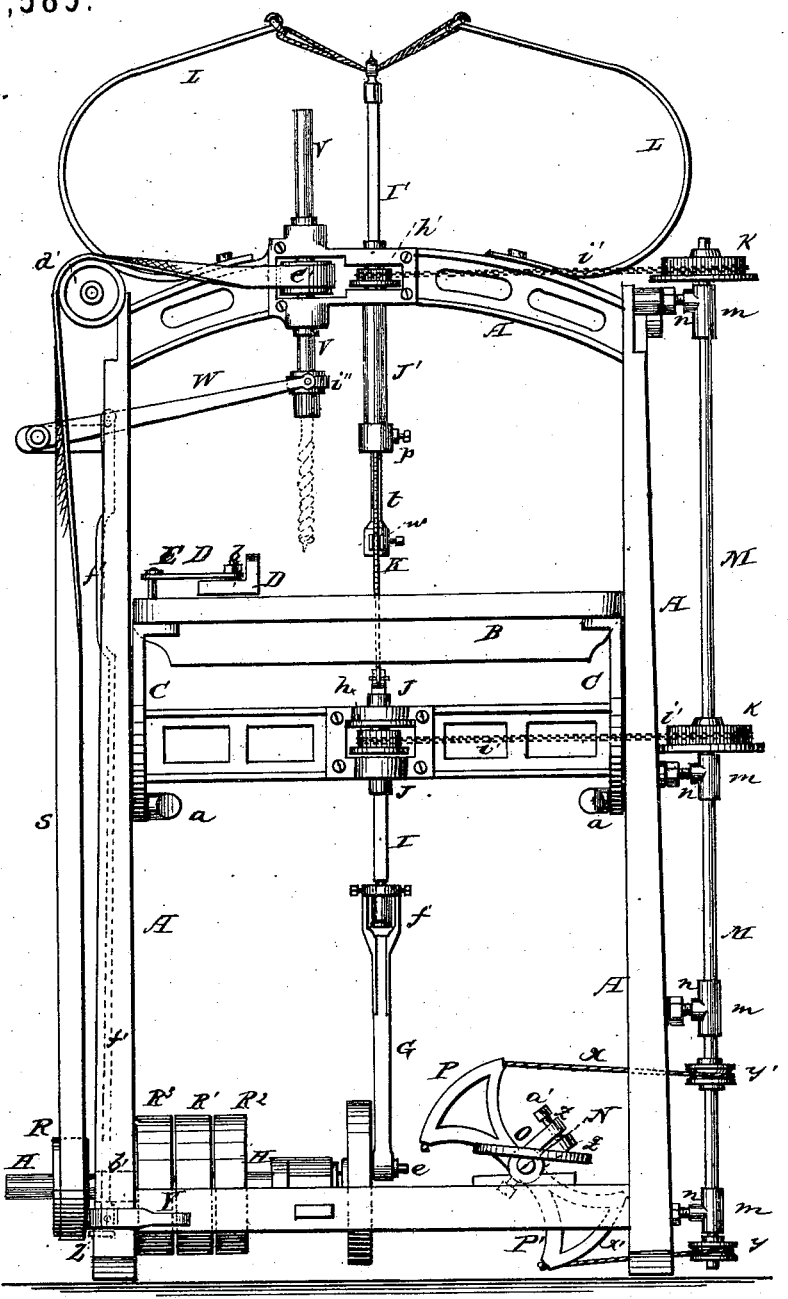

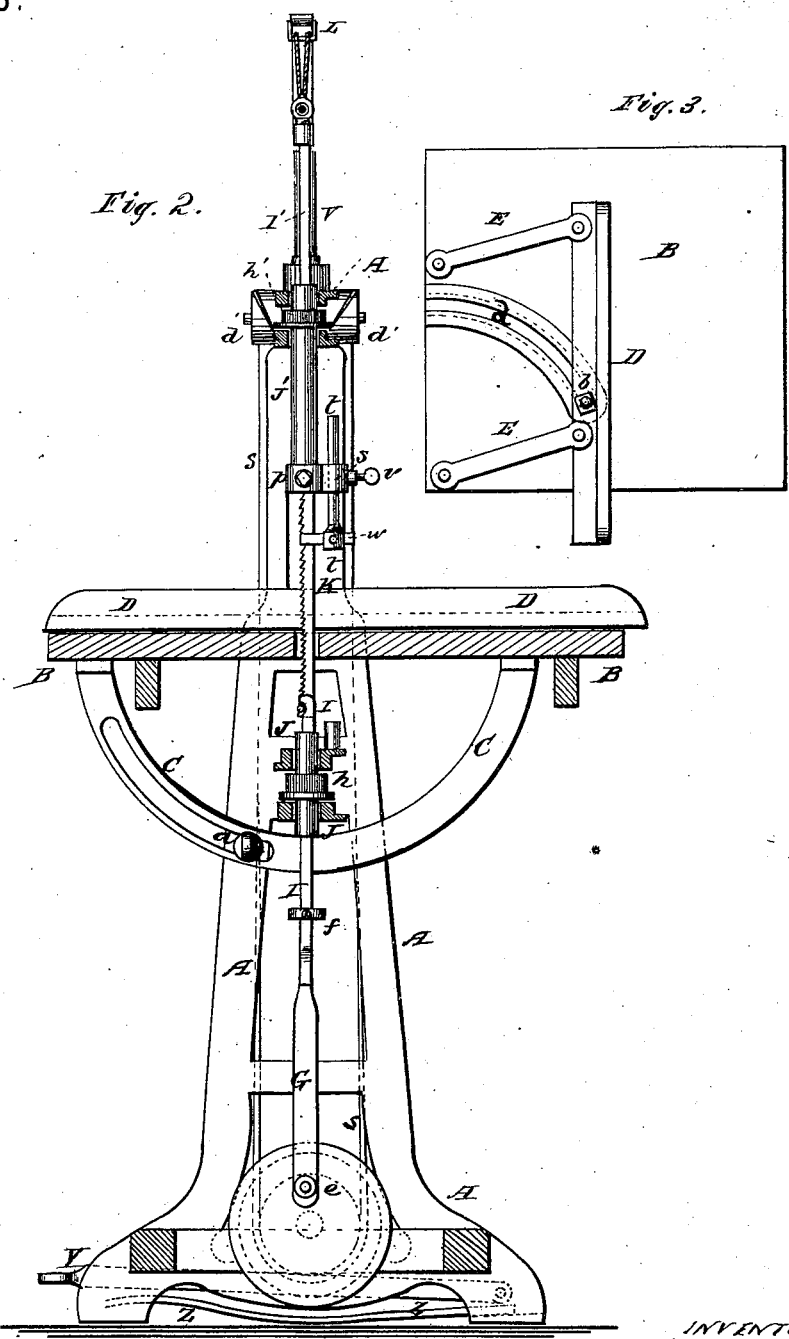

GEORGE S. YOUNG, OF CLEARFIELD, PENNSYLVANIA.

IMPROVEMENT IN SCROLL-SAWING-MACHINES.

Specification forming part of Letters Patent No. 161,585, dated March 30, 1875; application filed February 27, 1875.

*To all whom it may concern:*

Be it known that I, GEORGE S. YOUNG, of Clearfield, in the county of Clearfield and State of Pennsylvania, have invented certain new and useful Improvements in Scroll-Sawing Machines; and I do hereby declare that the following is a full, clear, and exact description thereof, which will enable others skilled in the art to which it pertains to make and use the same, reference being had to the accompanying drawings, and to the letters of reference marked thereon, which form a part of this specification.

My invention relates to that class of scroll-sawing machines in which the saw is made to turn in either direction; and it consists in the construction of the devices whereby the saw is rotated, in the construction of the saw-couplings, and in the construction and combination of parts, as will be hereinafter more fully set forth. My invention further consists in the construction of a boring apparatus combined with the scroll-sawing machine.

In the annexed drawings, Figure 1 represents a side elevation of a machine embodying my invention. Fig. 2 is a vertical section, and Fig. 3 is a view of the upper or top side of the table.

A represents the frame-work of my machine, constructed in any suitable manner to contain the various working parts thereof. B is the saw-table, hung upon pivots in the side pieces of the frame A, and provided at each end, on the under side, with a semicircle, C, part of which is slotted, as shown, and fastened by a set-screw, a, to the frame. By this means the table B can be tilted and held at any angle desired. On the table B is a movable gage, D, connected to the table by two pivoted links, E E, so as to be moved on parallel lines to and from the saw, as desired. The gage is held at any point where desired by a bolt, b, passing through a curved T-shaped groove in the table, and through the gage, and then fastened by a nut on top. H is the driving-shaft, provided at its inner end with a crank or crank-pin, e, on which is placed the pitman G. The upper end of this pitman is, by a swivel-joint, f, connected with a square bar, I, which slides up and down in a sleeve, J, of cylindrical form on the exterior. This sleeve has its bearings in a cross-bar or girder of the frame, and is provided with a chain-wheel, h, as shown. K represents the saw, the lower end of which is detachably coupled to the upper end of the bar I, and the upper end of the saw is in like manner coupled to the lower end of a bar, I', which passes up through a sleeve, J', having its bearings in the upper cross-bar or girder of the frame. The upper end of the bar I' is connected to springs L L, in the usual manner. On the sleeve J' is secured a chain-wheel, h', similar to that on the lower sleeve J. The two chain-wheels h h' are, by chains i i, connected with larger chain-wheels k k upon an upright shaft, M, on the outside of the frame. The shaft M is placed in bearings m m, which are adjustably attached by means of screws n n with the frame so that the shaft can be adjusted out and in, as required, to keep the chains i at the proper tension. By revolving the shaft M in either direction, the saw K is rotated at both ends precisely alike. On the upper sleeve J', at the lower end, is fastened a collar, p, on which is formed a tube or socket, s, for the reception of a rod, t, held therein by a set-screw, v, as shown. In the lower end of the rod t is adjustably fastened the saw-guide w. By these means the guide w may be raised and lowered as required, and in whatever position it may be it rotates with the saw, and hence cannot get out of place. The shaft M is rotated by the following means: In the lower part of the frame is a shaft, N, provided with a treadle or foot-piece, O, at its front end. On this shaft are two quadrants, P P', connected by chains x x' with pulleys y y' on the shaft M. The quadrants are each provided with an arm, z, through one of which passes a set-screw, a', bearing against the other arm. The quadrant P is fast on the shaft, while the quadrant P' is loose thereon. It will readily be seen that the operator, by pressing down either end of the foot-piece O, causes the shaft M to revolve, thereby rotating the saw. By means of the arms z z and set-screw a', the chains x x' are held at the proper tension, according to the adjustment on the shaft M, it being understood that the two chains x x' wind up on their respective pulleys y y' in opposite directions. On the driving-shaft H are three pulleys, $R^1$, $R^2$, and $R^3$. The middle pulley $R^1$ is loose; the pulley $R^2$ is fast on the shaft, and drives the saw. The third or outside pulley, $R^3$, has a long hub or sleeve, $b'$, which extends through the box, and receives a pulley, R, on the outside, to drive a boring attachment combined with the scroll-sawing machine by means of a belt, S, which runs over idle-pulleys $d'$ at the top of the frame, and around a pulley or hub, $e'$, journaled in the frame. In this hub or pulley is feathered a vertical boring-spindle, V, in the lower end of which the bit is to be inserted and fastened. On the spindle V, near the lower end, is a loose collar, $e''$, held between flanges on the spindle, and this collar is pivoted in the forked end of a lever, W, the other end of which is loosely pivoted to an arm projecting from the frame. The lever W is, by a rod, $f'$, connected to a treadle, Y, in the lower part of the frame, which treadle is, by a spring, Z, held in an elevated position to raise the boring-spindle up. When the driving-belt is applied to the pulley $R^3$, the spindle revolves, and then, by pressing down the treadle, the hole may be bored.

I am aware of Patent No. 157,775, and, therefore, claim nothing shown therein; but

Having thus fully described my invention, what I claim as new, and desire to secure by Letters Patent, is—

1. The combination, with the sleeve $J'$, of the collar $p$, with tube $s$, adjustable rod $t$, and adjustable guide $w$, arranged to turn with the saw, substantially as and for the purposes herein set forth.

2. The combination, with the upright shaft M, of the pulleys $y\ y'$, chains $x\ x'$, quadrants P P', with arms $z\ z$, set-screw $a'$, shaft N, and foot-piece O, all constructed substantially as and for the purposes herein set forth.

3. The combination, with the driving-shaft of a scroll-sawing machine, of the loose pulley $R^1$, fast pulley $R^2$, pulley $R^3$, having elongated hub $b'$, with pulley R, and the belt S, connecting with the boring-spindle V, substantially as and for the purposes herein set forth.

In testimony that I claim the foregoing as my own I affix my signature in presence of two witnesses.

GEO. S. YOUNG.

Witnesses:
  C. H. WATSON,
  N. B. CLARKE.